United States Patent
Hatton et al.

(10) Patent No.: US 10,267,423 B2
(45) Date of Patent: Apr. 23, 2019

(54) HIGH TEMPERATURE VALVE SHAFT SEAL

(71) Applicant: BorgWarner Inc., Auburn Hills, MI (US)

(72) Inventors: Bruce M. Hatton, Lake Orion, MI (US); Murray Busato, Clinton Township, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/912,972

(22) PCT Filed: Aug. 25, 2014

(86) PCT No.: PCT/US2014/052438
§ 371 (c)(1),
(2) Date: Feb. 19, 2016

(87) PCT Pub. No.: WO2015/031220
PCT Pub. Date: Mar. 5, 2015

(65) Prior Publication Data
US 2016/0201826 A1    Jul. 14, 2016

Related U.S. Application Data

(60) Provisional application No. 61/870,998, filed on Aug. 28, 2013.

(51) Int. Cl.
*F16J 15/18* (2006.01)
*F02B 39/00* (2006.01)
(Continued)

(52) U.S. Cl.
CPC ............ *F16J 15/185* (2013.01); *F02B 37/16* (2013.01); *F02B 37/183* (2013.01); *F02B 39/00* (2013.01);
(Continued)

(58) Field of Classification Search
CPC ................. F16J 15/185; F16J 15/16; F16C 33/74; F16C 17/02; F02M 26/00; F02M 35/10;
(Continued)

(56) References Cited

U.S. PATENT DOCUMENTS 3,173,650 A * 3/1965 Cotterman ............ F16K 1/2265
251/288
3,346,005 A * 10/1967 Hanssen ............... F16K 1/2265
137/375

(Continued)

FOREIGN PATENT DOCUMENTS

CN    103109058 A    5/2013
JP    09296867 A    11/1997
(Continued)

OTHER PUBLICATIONS

International Search Report and Written Opinion dated Dec. 5, 2014; International Application No. PCT/US2014/052438; 15 pages.
(Continued)

*Primary Examiner* — Marina A Tietjen
(74) *Attorney, Agent, or Firm* — BrooksGroup

(57) ABSTRACT

A number of variations may include a product comprising: a bushing (100) located at a cavity (56) formed by a stationary body (46) of a valve (12), and located around a movable stem (48) of the valve (12), wherein the bushing (100) facilitates movement of the stem (48); and a seal member (102, 104) located in the cavity (46), around the stem (48), and on the inboard side of the bushing (100), wherein the seal member (102, 104) substantially prevents fluid-flow between an outer diametrical surface (76) of the stem (48) and a confronting inner diametrical surface (120, 128) of the seal member (102, 104), forming a first seal.

14 Claims, 3 Drawing Sheets

(51) Int. Cl.
| | | |
|---|---|---|
| *F02B 37/18* | (2006.01) | |
| *F02B 37/16* | (2006.01) | |
| *F16K 41/00* | (2006.01) | |
| *F16K 1/22* | (2006.01) | |
| *F16K 1/226* | (2006.01) | |
| *F16C 17/02* | (2006.01) | |
| *F16C 33/74* | (2006.01) | |
| *F02B 37/12* | (2006.01) | |
| *F02M 26/05* | (2016.01) | |

(52) U.S. Cl.
CPC .............. *F16C 17/02* (2013.01); *F16C 33/74* (2013.01); *F16K 41/00* (2013.01); *F02B 37/127* (2013.01); *F02M 26/05* (2016.02); *Y02T 10/144* (2013.01)

(58) Field of Classification Search
CPC ....... F02M 26/05; F16K 41/00; F16K 1/1168; F16K 1/224; F16K 1/225; Y02T 10/144; F02B 39/00; F02B 37/183; F02B 37/16; F02B 37/127
USPC .......................................................... 251/306
See application file for complete search history.

(56) References Cited

U.S. PATENT DOCUMENTS

| | | | | |
|---|---|---|---|---|
| 3,979,104 | A * | 9/1976 | LaCoste ............... | F16J 15/3464 251/214 |
| 3,988,000 | A * | 10/1976 | Reese ................... | F16K 1/2268 251/214 |
| 3,991,974 | A * | 11/1976 | Bonafous .............. | F16K 1/2265 251/152 |
| 4,022,424 | A * | 5/1977 | Davis .................... | F16K 1/2268 251/214 |
| 4,291,863 | A * | 9/1981 | Gachot ................. | F16K 1/2268 251/214 |
| 4,294,428 | A * | 10/1981 | Okada ................... | F16K 1/2268 251/214 |
| 4,353,388 | A * | 10/1982 | Isoyama ............... | F16K 1/2268 137/240 |
| 5,152,501 | A * | 10/1992 | Raymond, Jr. ....... | F16K 1/2265 251/305 |
| 5,269,493 | A * | 12/1993 | Junier ................. | B60R 25/0225 137/375 |
| 5,673,895 | A * | 10/1997 | Kaneko ................. | F16K 1/2268 251/305 |
| 2002/0134960 | A1* | 9/2002 | Zwick .................... | F16K 1/224 251/214 |
| 2004/0011327 | A1* | 1/2004 | Oyamada ............. | F02M 37/043 123/337 |
| 2010/0206406 | A1* | 8/2010 | Nakamura ............ | F16K 1/2268 137/544 |
| 2011/0278486 | A1* | 11/2011 | Brozio .................... | F02D 9/106 251/305 |
| 2013/0186378 | A1 | 7/2013 | Peterson et al. | |
| 2014/0185976 | A1* | 7/2014 | Enders ................ | F16C 33/7896 384/486 |
| 2014/0314346 | A1* | 10/2014 | Thoma ................... | F16C 33/74 384/16 |
| 2015/0267752 | A1* | 9/2015 | Navarro ................ | F16C 33/783 384/148 |
| 2015/0275976 | A1* | 10/2015 | Tanaka ................... | F16C 33/74 384/2 |

FOREIGN PATENT DOCUMENTS

| | | |
|---|---|---|
| JP | 2005042845 A | 2/2005 |
| JP | 2005291129 A | 10/2005 |

OTHER PUBLICATIONS

Chinese Office Action dated May 4, 2017 ; Application No. 201480043934.1; Applicant: BorgWarner Inc.; 8 pages.
Chinese Office Action dated Dec. 13, 2017 ; Application No. 201480043934.1 Applicant: BorgWarner Inc.; 6 pages.
Chinese Office Action dated Jun. 1, 2018 ; Application No. 201480043934.1; Applicant: BorgWarner Inc.; 6 pages.

* cited by examiner

HIGH TEMPERATURE VALVE SHAFT SEAL

CROSS-REFERENCE TO RELATED APPLICATIONS

This application claims benefit of the U.S. Provisional Application No. 61/870,998 filed Aug. 28, 2013.

TECHNICAL FIELD

The field to which this disclosure generally relates includes valves that regulate fluid-flow in an internal combustion engine breathing system, seals used with the valves, and methods of making and using the same.

BACKGROUND

Automotive internal combustion engines are often equipped with breathing systems. Valves are commonly located throughout the breathing systems to regulate fluid-flow between the breathing system components.

SUMMARY OF ILLUSTRATIVE VARIATIONS

One illustrative variation may be a product comprising: a bushing located at a cavity formed by a stationary body of a valve, and located around a movable stem of the valve, wherein the bushing facilitates movement of the stem; and a seal member located in the cavity, around the stem, and on the inboard side of the bushing, wherein the seal member substantially prevents fluid-flow between an outer diametrical surface of the stem and a confronting inner diametrical surface of the seal member, forming a first seal.

Another illustrative variation may be a product comprising: an engine breathing system valve comprising: a body forming a cavity; a member disposed within the body, wherein the member opens and closes a port formed within the body to permit and prevent fluid-flow through the port; and a stem connected to the member and extending through the cavity, wherein the stem moves to cause the member to open and close the port; a bushing located in the cavity and around the stem, wherein the bushing facilitates movement of the stem; a first seal member located in the cavity, around the stem, and on the inboard side of the bushing, wherein the seal member substantially prevents fluid-flow between an outer diametrical surface of the stem and a confronting inner diametrical surface of the seal member, forming a first seal; a second seal member located in the cavity, around the stem, and on the inboard side of the bushing, wherein the second seal member substantially prevents fluid-flow between the outer diametrical surface of the stem and a confronting inner diametrical surface of the second seal member, forming a second seal; and a biasing member located in the cavity, around the stem, and inboard of the bushing, wherein the biasing member causes axial surfaces of the seal members to bear against confronting axial surfaces of the bushing and the valve body in order to substantially prevent fluid-flow between the confronting axial surfaces, forming third and fourth seals.

Another illustrative variation may be a method comprising: providing an engine breathing system valve comprising: a body forming a cavity; a member disposed within the body, wherein the member opens and closes a port formed within the body to permit and prevent fluid-flow through the port; and a stem connected to the member and extending through the cavity, wherein the stem moves to cause the member to open and close the port; providing a bushing located at the cavity and around the stem; forming a first radial seal around an outer diametrical surface of the stem inboard of the bushing; forming a second redial seal around an outer diametrical surface of the stem inboard of the bushing; forming a first axial seal inboard of the bushing; and forming a second axial seal inboard of the bushing.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

The figures show several illustrative variations and applications of an assembly 10 that may be used with an engine breathing system valve 12 and that may minimize or altogether prevent fluid-flow leakage between a body and a stem of the valve, while effectively facilitating movement therebetween. The assembly 10 may block or redirect an otherwise relatively direct potential fluid-flow leak path. And, the assembly 10 may be suitable for use in relatively increased operating temperatures and may be constructed and arranged to accommodate thermal expansion and contraction as may occur upon temperature fluctuations during use and non-use of the engine breathing system valve 12.

In the illustrated variations and applications, the assembly 10 has components with a generally annular and cylindrical shape which define various directions with respect to the shape. For example, radially refers to a direction that is generally along an imaginary radius of the shape, axially refers to a direction that is generally parallel to an imaginary center axis of the shape, and circumferentially refers to a direction that is generally along an imaginary circumference of the shape.

Figure 1:
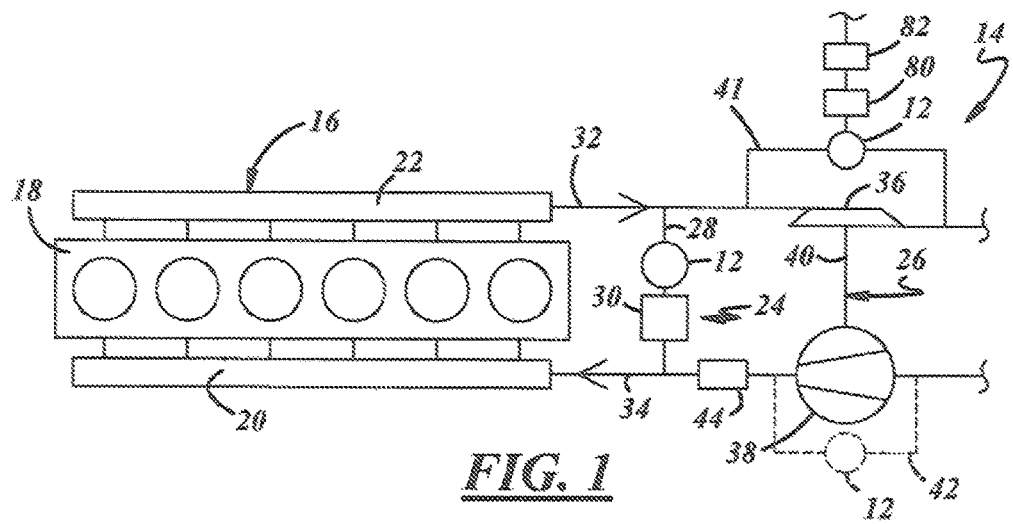
FIG. 1 is a schematic showing several illustrative variations of an internal combustion engine breathing system.

Referring to FIG. 1, the engine breathing system valve 12 may be used at various locations in an engine breathing system 14 of an engine 16. The engine 16 may be an internal combustion engine including, but not limited to, gasoline, diesel, or alternative fuel engines. The engine 16 may combust fuel and expel fluid in the form of exhaust gasses to the engine breathing system 14. The engine 16 may be of different types having different arrangements and different numbers of cylinders including, but not limited to, in-line, V-type, V-6, V-8, rotary, and naturally aspirated. A cylinder block 18 may define multiple piston bores. An intake manifold 20 may be equipped on an intake side of the engine 16 to direct and supply air and/or air-fuel mixture to the engine. An exhaust manifold 22 may be equipped on an exhaust side of the engine 16 to direct fluid-flow, such as exhaust gasses and matter, exhaled from the engine to the engine breathing system 14.

The engine breathing system 14 may be used to manage fluid-flow delivered to the engine 16 and expelled from the engine, and to decrease exhaust emissions and increase overall engine efficiency. The engine breathing system 14 may have various arrangements and various engine breathing system components. The example arrangement of FIG. 1 is meant only to show some of the fluid-flow relationship possibilities among components of the engine breathing system 14, and does not necessarily indicate direct or indirect connections or passages among the components. Other arrangements may exist and may depend on factors including the architecture, type, and desired performance of the engine 16. The example shown in FIG. 1 may include an engine gas recirculation (EGR) assembly 24 and a turbocharger 26.

The EGR assembly 24 may be used to recirculate and direct a measured amount of exhaust gas expelled from the engine 16 to the intake side of the engine. Depending on the variation and circumstances, the recirculated exhaust gas may mix with incoming air and/or air-fuel mixture and may decrease or increase the combustion temperature taking place in the engine 16. The EGR assembly 24 may have various constructions, arrangements, and components. The illustrative variations shown in FIG. 1 may include an EGR passage 28 that communicates fluid-flow between the exhaust and intake sides, an EGR cooler 30, and an EGR valve such as the engine breathing system valve 12 or another valve. The EGR cooler 30 may be a heat exchanger that cools the exhaust gasses that flow therethrough. The EGR valve may regulate exhaust gas flow from an exhaust passage 32 to an intake passage 34. The example EGR assembly 24 may be a high pressure EGR assembly. In other variations, a low pressure EGR assembly may also be included.

The turbocharger 26 may be driven by exhaust gas expelled from the engine 16 and may force an additional amount of air or air-fuel mixture into the engine to improve engine performance. The turbocharger 26 may come in various types including a fixed geometry turbocharger, a variable geometry turbocharger, a 1-stage turbocharger arrangement, a 2-stage turbocharger arrangement, or other types. The turbocharger 26 may include a turbine 36 that is directly driven by the exhaust gas flow and that in turn drives a compressor 38 via a common shaft assembly 40. The compressor 38 pressurizes air that eventually enters the engine 16.

The turbocharger 14 may also include a bypass passage 41, or a waste gate, which diverts exhaust gasses around the turbine 36. A bypass valve, such as the valve 12 or another valve, may be located within the bypass passage 41 in order to regulate fluid-flow through the bypass passage. In some variations, another bypass passage 42 (shown in phantom) may be included to divert intake air around the compressor 38. A bypass valve, such as the valve 12 or another valve, may be located within the bypass passage 42 to regulate fluid-flow through the bypass passage.

In other variations, the engine breathing system 14 may have more, less, and/or different components than shown and described. For example, one or more charge-air coolers 44 may be located between the components, a throttle valve may be included, an exhaust gas aftertreatment device may be included such as a diesel particulate filter (DPF) or a catalytic converter, and another turbocharger may be provided constituting a two-stage turbocharging arrangement.

The engine breathing system valve 12 may be used in the engine breathing system 14 at the various locations discussed above, and may be located at other places in the engine breathing system. The engine breathing system valve 12 may control and regulate fluid-flow in order to permit (open) fluid-flow therethrough or prevent (close) fluid-flow therethrough. The valve 12 may have various constructions, configurations, and components. The illustrative variation of valve 12, shown in FIG. 2, may include a valve body or housing 46, a stem or shaft 48, and a valve member or plate 50.

The valve body 46 may constitute the casing through which fluid-flow travels in the engine breathing system valve 12. The valve body 46 may be a one-piece structure or may be made of separate pieces that are subsequently put together. The valve body 46 may be comprised of materials including, but not limited to, a ductile iron, a high silicon iron, a steel alloy such as a stainless steel, a ceramic, or a high temperature polymer such as a thermoset or thermoplastic. The valve body 46 may have a port 52 and may have a hub 54. During use, fluid-flow may travel through the port 52, and the hub 54 may support and facilitate movement of the stem 48.

Figure 2:
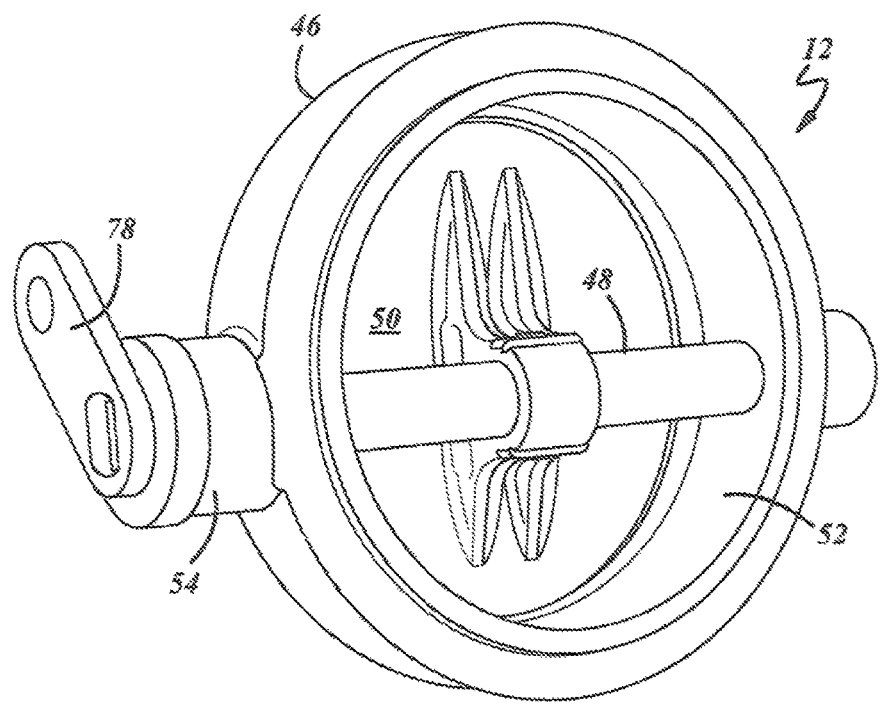
FIG. 2 is a perspective view showing an illustrative variation of an engine breathing system valve.
Figure 3:
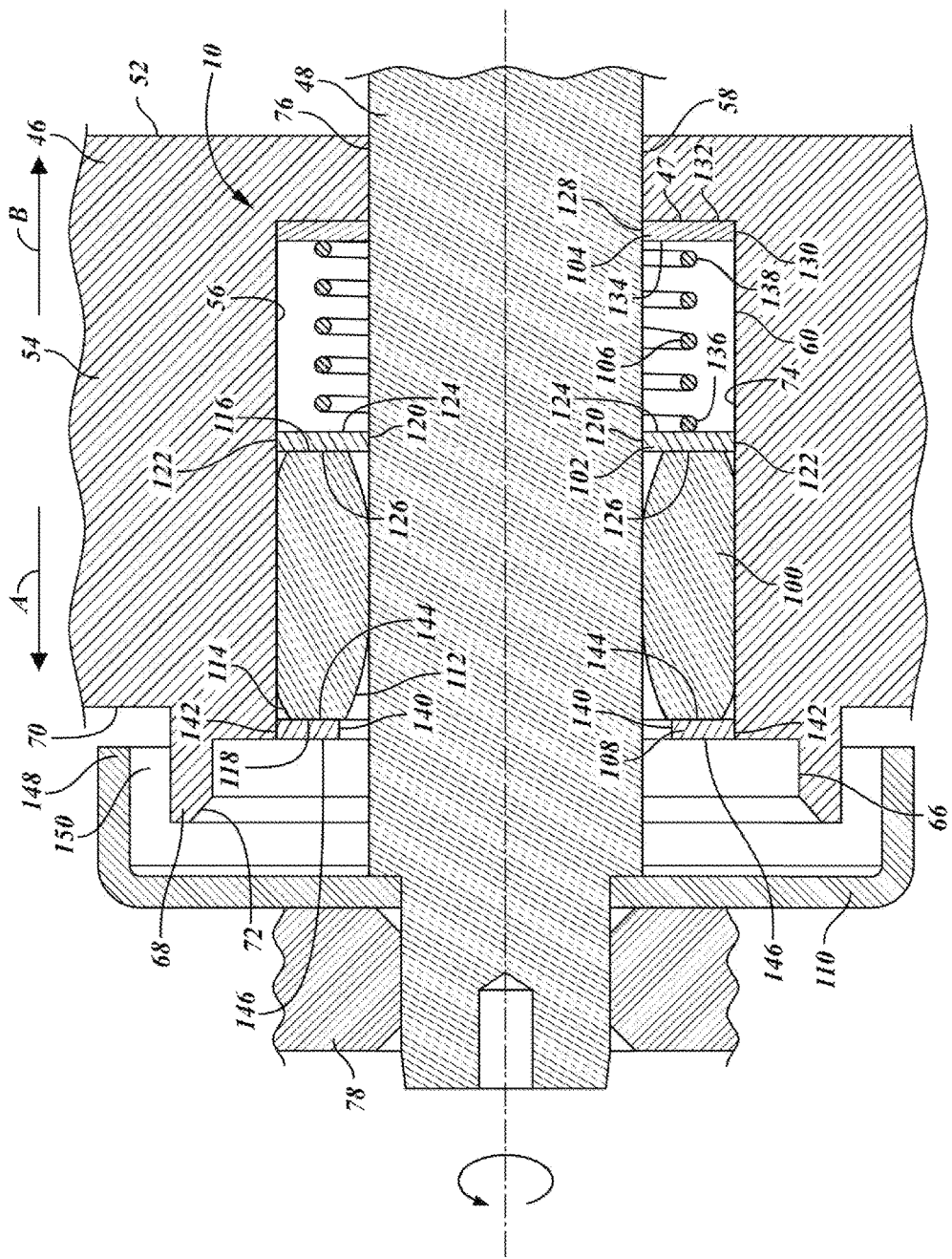
FIG. 3 is a cross-sectional view showing several illustrative variations of a bushing and sealing assembly.

Referring to FIGS. 2 and 3, a cavity 56 may be located in the valve body 46 at the hub 54 or at another location and may receive the stem 48 and may receive at least some of the components of the assembly 10. In general, the cavity 56 may be constructed and arranged in part for suitability with the assembly 10, and thus may have different constructions and arrangements depending on that of the assembly.

In the illustrative variations of FIG. 3, the cavity 56 may have a generally cylindrical shape with portions of different diameters or with different countersunk portions. A first portion 58 may have a first diameter that may be dimensioned to directly-circumferentially-surround the stem 48. A second portion 60 may have a second diameter that may be dimensioned to directly-circumferentially-surround a component or components of assembly 10. A third portion 66 may have a third diameter. Other portions of cavity 56 may have other diameters that may be dimensioned to directly-circumferentially-surround one or more other components of the assembly 10 or may be dimensioned for other purposes.

The cavity 56 may also have a flange 68 axially protruding in an outboard, or generally axially-outward, direction A for a distance away from an outside surface 70 of the valve body 46. The cavity 56 may have an open end 72 at the flange 68. And, each portion 58, 60, 66 may have an inner diametrical surface 74 that may be radially-inwardly directed and may be circumferentially-continuous therearound.

The stem 48 may be a rod or other structure that may be carried by the valve body 46. The stem 48 may be connected to the valve member 50 and may translate movement to the valve member. The stem 48 may have an outer diametrical surface 76 that may be radially-outwardly directed and may be circumferentially-continuous therearound. Near an outboard free end of the stem 48, a lever 78 may be connected to the stem for movement by an actuator 80 (FIG. 1). The actuator 80 may selectively move (e.g., rotate) the stem 48 and the valve member 50 in order to open and close the port 52. The actuator 80 may be of various types, including electromechanical such as an electric motor or solenoid, pneumatic, or hydraulic. The operation of the actuator 80 may be controlled by an electronic control unit (ECU) 82 (FIG. 1).

The valve member 50 may be rotated by the stem 48 in order to open and close the engine breathing system valve 12, and thus permit and prevent fluid-flow in the port 52. The valve member 50 and the stem 48 may be one-piece, or may be, as shown, separate pieces that are connected together. The valve member 50 may be shaped and dimensioned to complement the shape of the port 52, and may have a disc, ellipse, oval, or some other shape.

The assembly 10 may minimize or substantially prevent fluid-flow leakage at the cavity 56 between the valve body 46 and the stem 48. During use of an engine breathing system valve, fluid-flow such as exhaust gasses may leak from an inboard side at a port (also called the hot side), through a cavity, and to an outboard side of a valve body (also called the atmospheric side; the atmospheric side is not necessarily the atmosphere immediately outside of the associated automobile). And in some cases, fluid-flow such as exhaust gasses like hydrocarbon and soot may leak and get between a stem and a bushing of an assembly, which could obstruct movement therebetween, damage the bushing, or both. The assembly 10 may be constructed and arranged to minimize or substantially prevent such leakage while limiting or avoiding obstruction of the movement between the valve body 46 and the stem 48.

The assembly 10 may be suitable for use in applications subject to relatively increased operating temperatures, such as at the exhaust side of the engine breathing system 14, and particularly at the bypass passage 41, where temperatures can range between 800° C.-1100° C. for gasoline and diesel engines, for example, during use. In some cases, elastomeric seals, such as some comprised of fluorocarbon or fluorosilicone, may not always be suitable and effective in applications of relatively increased operating temperatures.

As described, the assembly 10 may be used in, and as a part of, the engine breathing system valve 12. The assembly 10 may also be used in other valves and in other applications not necessarily described herein. For example, the assembly 10 may be used in, and as a part of, a valve with a stationary component (such as a body or housing) and a moveable component (such as shaft or stem); the moveable component may move by rotation or by back-and-forth, linear reciprocation. The assembly 10 may have various constructions, arrangements, and components that may depend in part upon, among other factors, the valve in which the assembly is used, the application in which the valve is used, and the desired leak-prevention performance.

In the illustrative variations of FIG. 3, the assembly 10 may include a bushing 100, a first seal member 102, a second sealing member 104, a biasing member 106, a retainer 108, and a shield 110.

The bushing 100 may be located internally within the cavity 56 and may be located around the stem 48, and may support and facilitate movement of the stem. The bushing 100 may have various constructions and arrangements which may depend in part upon, among other factors, the movement (e.g., rotation, linear) of the stem 48. The bushing 100 may have a generally cylindrical shape and may be comprised of a metal, or any other suitable material. The bushing 100 may have an inner diametrical surface 112 that may be radially-inwardly directed and may be circumferentially-continuous therearound. The inner diametrical surface 112 may directly confront the outer diametrical surface 76 of the stem 48. The bushing 100 may have an outer diametrical surface 114 that may be radially-outwardly directed and may be circumferentially-continuous therearound. The outer diametrical surface 114 may directly confront the inner diametrical surface 74 of the cavity 56. The bushing 100 may also have an inboard axial surface 116 that may be axially-inwardly directed (direction B), and may have an outboard axial surface 118 that may be axially-outwardly directed (direction A).

The first seal member 102 may be located at an inboard side of the bushing 100 and may be located internally within the cavity 56 and around the stem 48. The first seal member 102 may be used to substantially prevent fluid-flow between it and the stem 48. The first seal member 102 may have various constructions and arrangements which may depend in part upon, among other factors, the desired leak-prevention performance. The first seal member 102 may be constructed as an annular washer, and may be comprised of a metal material such as, but not limited to, stainless steel.

The first seal member 102 may have an inner diametrical surface 120 that may be radially-inwardly directed and may be circumferentially-continuous therearound. The inner diametrical surface 120 may directly confront the outer diametrical surface 76 of the stem 48. The first seal member 102 may have an outer diametrical surface 122 that may be radially-outwardly directed and may be circumferentially-continuous therearound. The outer diametrical surface 122 may directly confront the inner diametrical surface 74 of the cavity 56.

The first seal member 102 may also have an inboard axial surface 124 that may be axially-inwardly directed (direction B), and may have an outboard axial surface 126 that may be axially-outwardly directed (direction A). The inboard axial surface 124 of first seal member 102 may directly confront the biasing member 106, and the outboard axial surface 126 of first sealing member 102 may directly confront the inboard axial surface 116 of the bushing 100.

The inner diametrical surface 120 may define an inner diameter that may provide a close-fit between the first seal member 102 and the stem 48. A first radial seal may be formed at a circumferential interface of the confronting inner diametrical surface 120 and outer diametrical surface 76. The first radial seal may be a metal-to-metal seal. The first radial seal may substantially prevent fluid-flow therebetween, meaning it may altogether prevent fluid-flow or a relatively minor and de minimis amount of fluid-flow may pass therethrough.

In one variation, a first clearance may be defined between the inner diametrical surface 120 and the outer diametrical surface 76, while still substantially preventing fluid-flow as described. The first clearance may have a value ranging between about 0.015 mm to 0.025 mm, may have a value of about 0.020 mm, or may have another value. The first clearance may accommodate thermal expansion and contraction between the first seal member 102 and the stem 48 by providing a physical space between the seal member and the stem and may accommodate assembly of the components. For example, in operating conditions with relatively increased temperatures, the inner diametrical surface 120 may come into direct contact with the outer diametrical surface 76, and the first seal member 102 may move with the stem 48 and still may not substantially obstruct the stem's movement. In operating conditions with relatively decreased temperatures, on the other hand, the inner diametrical surface 120 may not make direct contact with the outer diametrical surface 76.

The outer diametrical surface 122 may define an outer diameter that may be less than the diameter of the second portion 60 of the cavity 56. In one variation, a second clearance may be defined between the outer diametrical surface 122 and the inner diametrical surface 74 of the cavity 56 at the second portion 60. The second clearance may have a value that is greater than that of the first clearance; for example, the second clearance may have a value ranging between about 0.10 mm to 0.50 mm, or may have another value. The second clearance may accommodate thermal expansion and contraction between the first seal member 102 and the valve body 46. For example, in operating conditions with relatively increased and decreased temperatures, the outer diametrical surface 122 may not make direct contact with the inner diametrical surface 74 of the cavity 56, and may not substantially obstruct the stem's movement (e.g., binding).

The second seal member 104 may be similar in some ways to the first seal member 102. The second seal member 104 may be located on the inboard side of bushing 100 and may be located internally within the cavity 56 and around the stem 48. The second seal member 104 may be used to substantially prevent fluid-flow between it and the stem 48. The second seal member 104 may have various constructions and arrangements which may depend in part upon, among other factors, the desired leak-prevention performance. The second seal member 104 may be constructed as an annular washer, and may be comprised of a metal material such as, but not limited to, stainless steel.

The second seal member 104 may have an inner diametrical surface 128 that may be radially-inwardly directed and may be circumferentially-continuous therearound. The inner diametrical surface 128 may directly confront the outer diametrical surface 76 of the stem 48. The second seal member 104 may have an outer diametrical surface 130 that may be radially-outwardly directed and may be circumferentially-continuous therearound. The outer diametrical surface 130 may directly confront the inner diametrical surface 74 of the cavity 56.

The second seal member 104 may also have an inboard axial surface 132 that may be axially-inwardly directed (direction B), and may have an outboard axial surface 134 that may be axially-outwardly directed (direction A). The inboard axial surface 132 of second seal member 104 may directly confront the outboard axial 47 surface of valve body 46, and the outboard axial surface 134 of second seal member 104 may directly confront the biasing member 106.

The inner diametrical surface 128 may define an inner diameter that may provide a close-fit between the second seal member 104 and the stem 48. A second radial seal may be formed at a circumferential interface of the confronting inner diametrical surface 128 and outer diametrical surface 76. The second radial seal may be a metal-to-metal seal. The second radial seal may substantially prevent fluid-flow therebetween, meaning it may altogether prevent fluid-flow or a relatively minor and de minimis amount of fluid-flow may pass therethrough.

In one variation, a third clearance may be defined between the inner diametrical surface 128 and the outer diametrical surface 76, while still substantially preventing fluid-flow as described. The third clearance may have a value ranging between about 0.015 mm to 0.025 mm, may have a value of about 0.020 mm, or may have another value. The third clearance may accommodate thermal expansion and contraction between the second seal member 104 and the stem 48 by providing a physical space between the seal member and the stem, and may accommodate assembly of the components. For example, in operating conditions with relatively increased temperatures, the inner diametrical surface 128 may come into direct contact with the outer diametrical surface 76, and the second seal member 104 may move (e.g., rotate) with the stem 48 and still may not substantially obstruct the stem's movement. In operating conditions with relatively decreased temperatures, on the other hand, the inner diametrical surface 128 may not make direct contact with the outer diametrical surface 76.

The outer diametrical surface 130 may define an outer diameter that may be less than the diameter of the second portion 60 of the cavity 56. In one variation, a fourth clearance may be defined between the outer diametrical surface 130 and the inner diametrical surface 74 of the cavity 56 at the second portion 60. The fourth clearance may have a value that is greater than that of the third clearance; for example, the fourth clearance may have a value ranging between about 0.10 mm to 0.50 mm, or may have another value. The fourth clearance may accommodate thermal expansion and contraction between the second seal member 104 and the valve body 46. For example, in operating conditions with relatively increased and decreased temperatures, the outer diametrical surface 130 may not make direct contact with the inner diametrical surface 74 of the cavity 56, and may not substantially obstruct the stem's movement (e.g., binding).

The biasing member 106 may be located inboard of bushing 100 and may be located internally within the cavity 56 and around the stem 48. The biasing member 106 may be used to exert axially-directed force against the first seal member 102, in direction A, and may be used do exert and axially-directed force against the second seal member 104, in direction B, and may urge the first seal member 102 against the bushing 100 and may urge the second seal member 104 against the valve body 46.

An outboard axial-directed force, in direction A, resulting from the pressure differential between the inboard axial surface 124 (hot side) and outboard axial surface 126 (atmospheric side) of the first seal member 102 may supplement the outboard axial-directed force exerted by the biasing member 106 on the first seal member 102.

The outboard axial surface 126 of the first seal member 102 may bear directly against the inboard axial surface 116 of the bushing 100, and a first axial seal may be formed at a planar interface of the confronting axial surfaces. The inboard axial surface 132 of the second seal member 104 may bear directly against the outboard axial surface 47 of the valve body 46, and a second axial seal may be formed at a planar interface of the confronting axial surfaces. The first and second axial seals may be metal-to-metal seals. The first and second axial seals may substantially prevent fluid-flow therebetween.

In various variations, the first seal member 102 and the second seal member 104 may be used alone or together, with or without the biasing member 106.

In one variation, the biasing member 106 may exert axial-directed forces equivalent to about 5 to 15 N, or may exert other forces. Minimum biasing force may allow the first seal member 102 to move radially and circumferentially relative to bushing 100 and may allow the second seal member 104 to move radially and circumferentially relative to valve body 46.

In other variations, the biasing member 106 may be a compression spring, a wave washer, or another suitable device which exerts a force. In the variation of FIG. 3, the biasing member 106 may be a compression spring that may have an outboard end 136 at the inboard axial surface 124 of the first seal member 102 and may have an inboard end 138 at the outboard axial surface 134 of the second seal member 104.

In other variations, one or more additional seal members may be included, depending on sealing requirements. Additional seal members may be located on either or both of the inboard and outboard sides of bushing 100.

The retainer 108 may be located at the outboard side of the bushing 100, and may be located internally within the cavity 56 and around the stem 48. The retainer 108 may be immovably fixed in the cavity 56 at the second portion 60, or at another portion, via staking, welding, threading, or any other suitable way. The retainer 108 may have various constructions and arrangements which may depend in part upon, among other factors, other components of the assembly 10 and the construction and arrangement of the cavity 56. The retainer 108 may be constructed as an annular washer, and may be comprised of a metal material such as stainless steel or cold rolled steel. Still referring to FIG. 3, the retainer 108 may have an inner diametrical surface 140 that may be radially-inwardly directed and may be circumferentially-continuous therearound. The inner diametrical surface 140 may directly confront the outer diametrical surface 76 of the stem 48, and may be spaced a sufficient distance therefrom so that the surfaces do not make direct contact with each other and the movement of the stem is not obstructed thereby. The retainer 108 may have an outer diametrical surface 142 that may be radially-outwardly directed and may be circumferentially-continuous therearound. The outer diametrical surface 142 may be fixed directly to the inner diametrical surface 74 of the cavity 56. The retainer 108 may also have an inboard axial surface 144 that may be axially-inwardly directed (direction B), and may have an outboard axial surface 146 that may be axially-outwardly directed (direction A). The inboard axial surface 144 may directly confront the bushing 100. In other variations, a retainer may not be required or it may be replaced by staking or by another suitable retaining method.

The shield 110 may be located at the outboard side of the retainer 108, and may be located externally outside of the cavity 56. The shield 110 may be located near the open end 72, and may be immovably fixed to the stem 48. The shield 110 may be constructed and arranged to permit fluid-flow that exits the cavity 56 at the open end 72, and to prevent fluid-flow from entering the cavity at the open end. The shield 110 may also be constructed and arranged to prevent exhaust gasses from exiting the cavity 56 with direct exposure to immediately surrounding components such as wires. The shield 110 may have different constructions and arrangements.

Referring to FIG. 3, the shield 110 may be generally shaped as a disc. The shield 110 may have a flange 148 that may be circumferentially-continuous and that may protrude in the inboard direction B. The flange 148 may be positioned with respect to the flange 68 in order to define a passage 150 therebetween. For example, the flange 148 may be spaced circumferentially around the flange 68 and by a radial distance from the flange 68; and the flange 148 may be spaced an axial distance from the outside surface 70 of the valve body 46. The passage 150 may make it easy for fluid-flow to exit the cavity 56, but may substantially block contaminants and debris, from the atmospheric side, from entering the cavity 56. In other variations the passage 150 may be defined in other ways.

Figure 4:
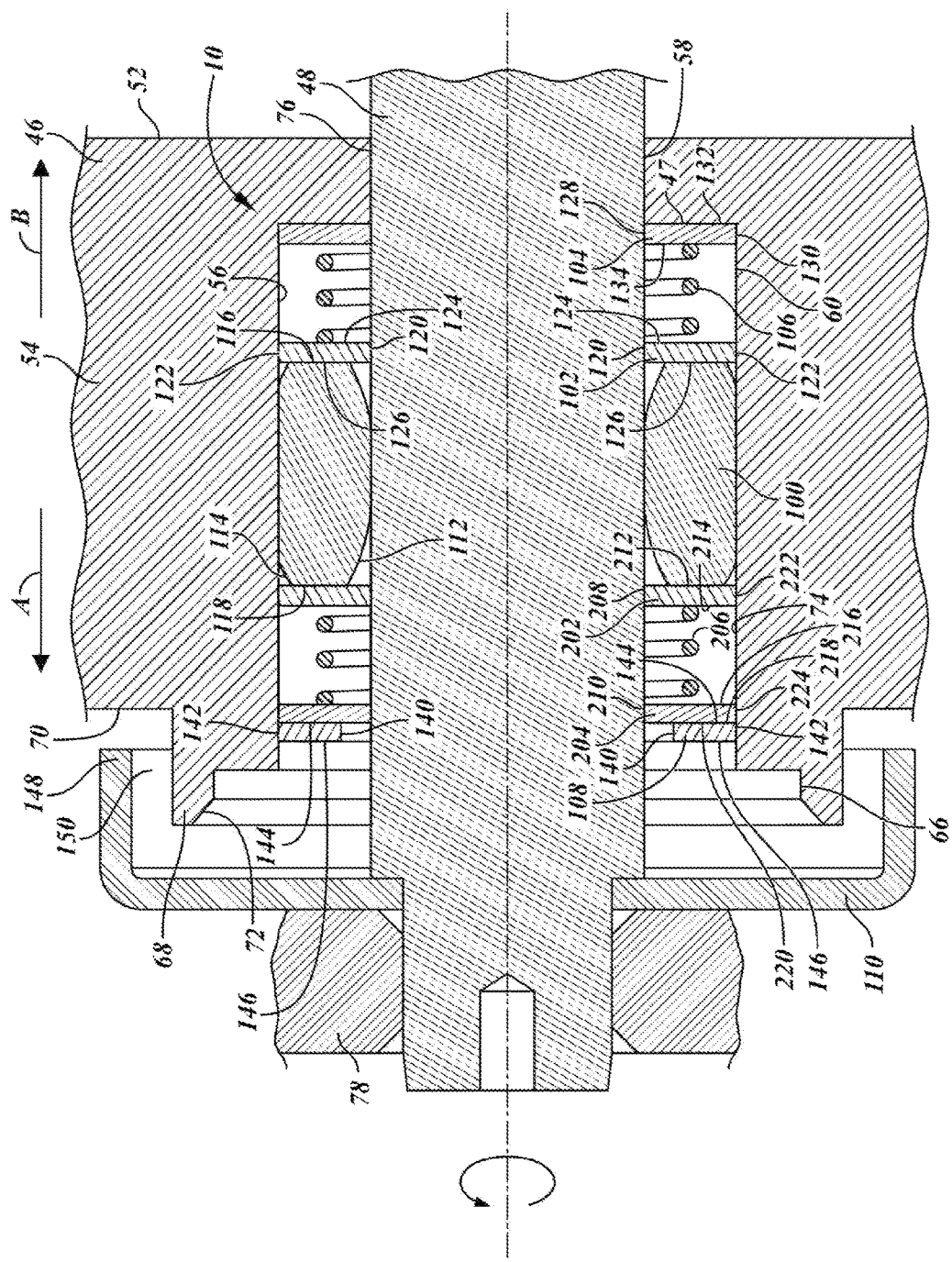
FIG. 4 is a cross-sectional view showing additional illustrative variations of a bushing and sealing assembly.

FIG. 4 illustrates additional variations of assembly 10. These variations are similar to the variations of FIG. 3, but may include a third seal member 202, a fourth seal member 204, and a second biasing member 206. The third seal member 202 and forth seal member 204 may be similar to first seal member 102 and second seal member 104 and may be used to provide similar third and fourth radial seals and third and fourth axial seals. The second biasing member 206 may be similar to the first biasing member 106. In various variations, the third seal member 202 and the fourth seal member 204 may be used alone or together, with or without second biasing member 206.

In other variations of the FIGS. 3 and 4, the different components may be used with one another. For example, first seal member 102 may be used alone or with one or more of seal members 104, 202, and 204, in any combination, or with any number of other seal members.

In other variations, the exact value of the various clearances described may be dependent upon, among other factors, the materials used for the respective components and the expected thermal expansion and contraction. For example, if the first seal member 102 and the stem 48 are made of the same or a similar material, then the expected expansion and contraction is minimal, in which case the first clearance can be minimized in value.

In other variations, the assembly 10 may have different constructions, arrangements, and components. For example, the assembly may include a bushing and a single seal member, and need not include a biasing member. In another variation, the seal members may have different dimensions with respect to one another. And in another variation, other seals may be formed; a radial seal may be formed between an outer diametrical surface of a seal member and the inner diametrical surface of the cavity, an axial seal may be formed between an axial surface of a seal member and a directly confronting surface, or a combination thereof.

In use, assembly 10 may minimize or altogether prevent potential fluid-flow leakage from port 52, through cavity 56, and to the atmospheric side of valve body 46. Assembly 10 may also effectively support and assist movement between stem 48 and valve body 46. Assembly 10 may force and guide fluid-flow that gets between stem 48 and valve body 46 to follow an indirect and labyrinth-like path through cavity 56, as compared to a direct axial path in which fluid-flow primarily follows the outer diametrical surface 76 of stem 48. The indirect path may make it harder for potential fluid-flow leakage to get to the atmospheric side, and may minimize or altogether prevent fluid-flow from getting between stem 48 and bushing 100.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product comprising: a bushing (100) located at a cavity (56) formed by a stationary body (46) of a valve (12), and located around a movable stem (48) of the valve (12), wherein the bushing (100) facilitates movement of the stem (48); and a seal member (102, 104) located in the cavity (46), around the stem (48), and on the inboard side of the bushing (100), wherein the seal member (102, 104) substantially prevents fluid-flow between an outer diametrical surface (76) of the stem (48) and a confronting inner diametrical surface (120, 128) of the seal member (102, 104), forming a first seal.

Variation 2 may include a product as set forth in Variation 1, further comprising a second seal member (102, 104) located in the cavity (46), around the stem (46), and on the inboard side of the bushing (100), wherein the second seal member (102, 104) substantially prevents fluid-flow between the outer diametrical surface (76) of the stem (48) and a confronting second inner diametrical surface (120, 128) of the second seal member (102, 104), forming a second seal.

Variation 3 may include a product as set forth in any of Variations 1-2, further comprising a biasing member (106) located in the cavity (56), around the stem (48), and inboard of the bushing (100), wherein the biasing member (106) causes an axial surface (124, 126, 132, 134) of the seal member (102, 104) to bear against a confronting axial surface (116, 47) of the bushing (100) or the valve body (46) in order to substantially prevent fluid-flow between the axial surfaces, forming a third seal.

Variation 4 may include a product as set forth in any of Variations 1-3, further comprising a biasing member (106) located in the cavity (56), around the stem (48), and inboard of the bushing (100), wherein the biasing member (106) causes axial surfaces (126, 132) of the seal members (102, 104) to bear against confronting axial surfaces (116, 47) of the bushing (100) and the valve body (46) in order to substantially prevent fluid-flow between the axial surfaces, forming third and fourth seals.

Variation 5 may include a product as set forth in any of Variations 1-4, wherein a first clearance is defined between confronting inner diametrical surfaces (120, 128) of the seal members (102, 104) and the outer diametrical surface (76) of the stem (48), and a second clearance is defined between confronting outer diametrical surfaces (122, 130) of the seal members (102, 104) and an inner diametrical surface (74) of cavity (56); and wherein the first clearance has a value that is less than the second clearance.

Variation 6 may include a product as set forth in any of Variations 1-5, wherein the value for the first clearance ranges between about 0.015 mm to 0.025 mm, in order to accommodate thermal expansion and contraction between the seal member (102, 104) and the stem (48) upon temperature fluctuations during use and non-use, and in order to substantially prevent fluid-flow between the outer diametrical surface (76) of the stem (48) and the inner diametrical surface (120, 128) of the seal member (102, 104).

Variation 7 may include a product as set forth in any of Variations 1-6, wherein the value of the force exerted by the biasing member (106) ranges between about 5 N to 15 N, in order to cause the axial surfaces (126, 132) of the seal members (102, 104) to bear against the confronting axial surfaces (116, 47) of the bushing (100) and the valve body (46) in order to substantially prevent fluid-flow between the axial surfaces, and in order to allow the seal members (102, 104) to move both radially and circumferentially relative to the bushing (100) and the valve body (46).

Variation 8 may include a product as set forth in any of Variations 1-7, further comprising a retainer (108) fixed in the cavity (56) and located outboard of the bushing (100).

Variation 9 may include a product as set forth in any of Variations 1-8, further comprising: a third seal member (202, 204) located in the cavity (56), around the stem (48), and outboard of the bushing (100), wherein the third seal member (202, 204) forms a fifth seal between the outer diametrical surface (78) of the stem (48) and inner diametrical surface (208, 210) of the third seal member (202, 204); and a second biasing member (206) located in the cavity (56), around the stem (48), and outboard of the bushing (100); wherein the second biasing member (206) causes the third seal member (202, 204) to bear against the bushing (100) or the retainer (108) in order to form a sixth seal between an axial surface (212, 214, 216, 218) of the third sealing member (202, 204) and a confronting axial surface (118) of the bushing (100) or a confronting axial surface (220) of the retainer (108).

Variation 10 may include a product as set forth in any of Variations 1-9, further comprising a fourth seal member (202, 204) located in the cavity (56), around the stem (48), and outboard of the bushing (100); wherein the fourth seal member (202, 204) forms a seventh seal between the outer diametrical surface (78) of the stem (48) and inner diametrical surface (208, 210) of the fourth seal member (202, 204); and wherein the second biasing member (206) causes the fourth seal member (202, 204) to bear against the bushing (100) or the retainer (108) in order to form an eighth seal between an axial surface (212, 214, 216, 218) of the fourth sealing member (202, 204) and a confronting axial surface (118) of the bushing (100) or a confronting axial surface (220) of the retainer (108).

Variation 11 may include a product as set forth in any of Variations 1-10, further comprising a shield (110) located at open end (72) of the cavity (56), wherein the shield (110) is constructed and arranged to permit fluid-flow to exit the cavity (56) at open end (72) and to substantially prevent contaminants and debris from entering the cavity (56) at the open end (72); wherein a first clearance is defined between confronting inner diametrical surfaces (120, 128 208, 210) of the seal members (102, 104, 202, 204) and the outer diametrical surface (76) of the stem (48), and a second clearance is defined between confronting outer diametrical surfaces (122, 130, 222, 224) of the seal members (102, 104, 202, 204) and an inner diametrical surface (74) of the cavity (56); wherein the first clearance has a value that is less than the second clearance and the value for the first clearance ranges between about 0.015 mm to 0.025 mm, in order to accommodate thermal expansion and contraction between the seal members (102, 104, 202, 204) and the stem (48) upon temperature fluctuations during use and non-use, and in order to substantially prevent fluid-flow between the outer diametrical surface (76) of the stem (48) and the inner diametrical surface (120, 128) of the seal member (102, 104); and wherein the value of the force exerted by the biasing members (106, 206) ranges between about 5 N to 15 N, in order to cause the axial surfaces (126, 132, 212, 218) of the seal members (102, 104, 202, 204) to bear against the confronting axial surfaces (47, 116, 118, 220) of the valve body (46), the bushing (100), and the retainer (108) in order to substantially prevent fluid-flow between the axial surfaces, and in order to allow the seal members (102, 104) to move both radially and circumferentially relative to the valve body (46), the bushing (100) and the retainer (108).

Variation 12 may include a product comprising: an engine breathing system valve (12), comprising: a body (46) forming a cavity (56); a member (50) disposed within the body (46), wherein the member (50) opens and closes a port (52) formed within the body (46) to permit and prevent fluid-flow through the port (52); and a stem (48) connected to the member (50) and extending through the cavity (56), wherein the stem (48) moves to cause the member (50) to open and close the port (52); a bushing (100) located in the cavity (56) and around the stem (48), wherein the bushing facilitates movement of the stem (48); a first seal member (102, 104) located in the cavity (46), around the stem (48), and on the inboard side of the bushing (100), wherein the seal member (102, 104) substantially prevents fluid-flow between an outer diametrical surface (76) of the stem (48) and a confronting inner diametrical surface (120, 128) of the seal member (102, 104), forming a first seal; a second seal member (102, 104) located in the cavity (46), around the stem (48), and on the inboard side of the bushing (100), wherein the second seal member (102, 104) substantially prevents fluid-flow between the outer diametrical surface (76) of the stem (48) and a confronting inner diametrical surface (120, 128) of the second seal member (102, 104), forming a second seal; and a biasing member (106) located in the cavity (56), around the stem (48), and inboard of the bushing (100), wherein the biasing member (106) causes axial surfaces (126, 132) of the seal members (102, 104) to bear against confronting axial surfaces (116, 47) of the bushing (100) and the valve body (46) in order to substantially prevent fluid-flow between the confronting axial surfaces, forming third and fourth seals.

Variation 13 may include a product as set forth in Variation 12, wherein a first clearance is defined between confronting inner diametrical surfaces (120, 128) of the seal members (102, 104) and the outer diametrical surface (76) of the stem (48), and a second clearance is defined between confronting outer diametrical surfaces (122, 130) of the seal members (102, 104) and an inner diametrical surface (74) of the cavity (56); and wherein the first clearance has a value that is less than the second clearance.

Variation 14 may include a product as set forth in any of Variations 12-13, wherein the value of the force exerted by the biasing member (106) ranges between about 5 N to 15 N, in order to cause the axial surfaces (126, 132) of the seal members (102, 104) to bear against the confronting axial surfaces (116, 47) of the bushing (100) and the valve body (46) in order to substantially prevent fluid-flow between the axial surfaces, and in order to allow the seal members (102, 104) to move both radially and circumferentially relative to the bushing (100) and the valve body (46).

Variation 15 may include a method comprising: providing an engine breathing system valve (12) comprising: a body (46) forming a cavity (56); a member (50) disposed within the body (46), wherein the member (50) opens and closes a port (52) formed within the body (46) to permit and prevent fluid-flow through the port (52); and a stem (48) connected to the member (50) and extending through the cavity (56), wherein the stem (48) moves to cause the member (50) to open and close the port (52); providing a bushing (100) located at the cavity (56) and around the stem (48); forming a first radial seal around an outer diametrical surface (76) of the stem (48) inboard of the bushing (100); forming a second redial seal around an outer diametrical surface (76) of the stem (48) inboard of the bushing (100); forming a first axial seal inboard of the bushing (100); and forming a second axial seal inboard of the bushing (100).

The above description of select examples of the invention is merely exemplary in nature and, thus, variations or variants thereof are not to be regarded as a departure from the spirit and scope of the invention.

What is claimed is:

1. A product comprising:
a bushing (100) located at a cavity (56) formed by a stationary body (46) of a valve (12), and located around a movable stem (48) of the valve (12), wherein the bushing (100) facilitates movement of the stem (48) and has an inboard side and an outboard side; and
a seal member (102, 104) located in the cavity (46), around the stem (48), and on the inboard side of the bushing (100), wherein the seal member (102, 104) prevents fluid-flow between an outer diametrical surface (76) of the stem (48) and a confronting inner diametrical surface (120, 128) of the seal member (102, 104), forming a first seal; and
a biasing member (106) located in the cavity (56), around the stem (48), and inboard of the bushing (100), wherein the biasing member (106) causes an axial surface (124, 126, 132, 134) of the seal member (102, 104) to bear against a confronting axial surface (116, 47) of the bushing (100) or the valve body (46) in order to prevent fluid-flow between the axial surfaces, forming a second seal.

2. A product as set forth in claim 1, further comprising a second seal member (102, 104) located in the cavity (46), around the stem (46), and on the inboard side of the bushing (100), wherein the second seal member (102, 104) prevents fluid-flow between the outer diametrical surface (76) of the stem (48) and a confronting second inner diametrical surface (120, 128) of the second seal member (102, 104), forming a second seal.

3. A product as set forth in claim 2, wherein the biasing member (106) causes axial surfaces (126, 132) of the seal members (102, 104) to bear against confronting axial surfaces (116, 47) of the bushing (100) and the valve body (46) in order to prevent fluid-flow between the axial surfaces, forming third and fourth seals.

4. A product as set forth in claim 3, wherein a first clearance is defined between confronting inner diametrical surfaces (120, 128) of the seal members (102, 104) and the outer diametrical surface (76) of the stem (48), and a second clearance is defined between confronting outer diametrical surfaces (122, 130) of the seal members (102, 104) and an inner diametrical surface (74) of cavity (56); and wherein the first clearance has a value that is less than the second clearance.

5. A product as set forth in claim 4, wherein the value for the first clearance ranges between 0.015 mm to 0.025 mm, in order to accommodate thermal expansion and contraction between the seal member (102, 104) and the stem (48) upon temperature fluctuations during use and non-use, and in order to prevent fluid-flow between the outer diametrical surface (76) of the stem (48) and the inner diametrical surface (120, 128) of the seal member (102, 104).

6. A product as set forth in claim 3, wherein the value of the force exerted by the biasing member (106) ranges between 5 N to 15 N, in order to cause the axial surfaces (126, 132) of the seal members (102, 104) to bear against the confronting axial surfaces (116, 47) of the bushing (100) and the valve body (46) in order to prevent fluid-flow between the axial surfaces, and in order to allow the seal members (102, 104) to move both radially and circumferentially relative to the bushing (100) and the valve body (46).

7. A product as set forth in claim 3, further comprising a retainer (108) fixed in the cavity (56) and located outboard of the bushing (100).

8. A product as set forth in claim 7, further comprising:
a third seal member (202, 204) located in the cavity (56), around the stem (48), and outboard of the bushing (100), wherein the third seal member (202, 204) forms a fifth seal between the outer diametrical surface (78) of the stem (48) and inner diametrical surface (208, 210) of the third seal member (202, 204); and
a second biasing member (206) located in the cavity (56), around the stem (48), and outboard of the bushing (100);
wherein the second biasing member (206) causes the third seal member (202, 204) to bear against the bushing (100) or the retainer (108) in order to form a sixth seal between an axial surface (212, 214, 216, 218) of the third sealing member (202, 204) and a confronting axial surface (118) of the bushing (100) or a confronting axial surface (220) of the retainer (108).

9. A product as set forth in claim 8, further comprising a fourth seal member (202, 204) located in the cavity (56), around the stem (48), and outboard of the bushing (100);
wherein the fourth seal member (202, 204) forms a seventh seal between the outer diametrical surface (78) of the stem (48) and inner diametrical surface (208, 210) of the fourth seal member (202, 204); and
wherein the second biasing member (206) causes the fourth seal member (202, 204) to bear against the bushing (100) or the retainer (108) in order to form an eighth seal between an axial surface (212, 214, 216, 218) of the fourth sealing member (202, 204) and a confronting axial surface (118) of the bushing (100) or a confronting axial surface (220) of the retainer (108).

10. The product of claim 9, further comprising a shield (110) located at open end (72) of the cavity (56), wherein the shield (110) is constructed and arranged to permit fluid-flow to exit the cavity (56) at open end (72) and to prevent contaminants and debris from entering the cavity (56) at the open end (72);
wherein a first clearance is defined between confronting inner diametrical surfaces (120, 128 208, 210) of the seal members (102, 104, 202, 204) and the outer diametrical surface (76) of the stem (48), and a second clearance is defined between confronting outer diametrical surfaces (122, 130, 222, 224) of the seal members (102, 104, 202, 204) and an inner diametrical surface (74) of the cavity (56);
wherein the first clearance has a value that is less than the second clearance and the value for the first clearance ranges between 0.015 mm to 0.025 mm, in order to accommodate thermal expansion and contraction between the seal members (102, 104, 202, 204) and the stem (48) upon temperature fluctuations during use and non-use, and in order to prevent fluid-flow between the outer diametrical surface (76) of the stem (48) and the inner diametrical surface (120, 128) of the seal member (102, 104); and
wherein the value of the force exerted by the biasing members (106, 206) ranges between 5 N to 15 N, in order to cause the axial surfaces (126, 132, 212, 218) of the seal members (102, 104, 202, 204) to bear against the confronting axial surfaces (47, 116, 118, 220) of the valve body (46), the bushing (100), and the retainer (108) in order to prevent fluid-flow between the axial surfaces, and in order to allow the seal members (102, 104) to move both radially and circumferentially relative to the valve body (46), the bushing (100) and the retainer (108).

11. A product comprising:
an engine breathing system valve (12), comprising:
a body (46) forming a cavity (56);
a member (50) disposed within the body (46), wherein the member (50) opens and closes a port (52) formed within the body (46) to permit and prevent fluid-flow through the port (52); and
a stem (48) connected to the member (50) and extending through the cavity (56), wherein the stem (48) moves to cause the member (50) to open and close the port (52);
a bushing (100) located in the cavity (56) and around the stem (48), wherein the bushing facilitates movement of the stem (48) and has an inboard side and an outboard side;
a first seal member (102, 104) located in the cavity (46), around the stem (48), and on the inboard side of the bushing (100), wherein the seal member (102, 104) prevents fluid-flow between an outer diametrical surface (76) of the stem (48) and a confronting inner diametrical surface (120, 128) of the seal member (102, 104), forming a first seal;
a second seal member (102, 104) located in the cavity (46), around the stem (48), and on the inboard side of the bushing (100), wherein the second seal member (102, 104) prevents fluid-flow between the outer diametrical surface (76) of the stem (48) and a confronting inner diametrical surface (120, 128) of the second seal member (102, 104), forming a second seal; and
a biasing member (106) located in the cavity (56), around the stem (48), and inboard of the bushing (100), wherein the biasing member (106) causes axial surfaces (126, 132) of the seal members (102, 104) to bear against confronting axial surfaces (116, 47) of the bushing (100) and the valve body (46) in order to prevent fluid-flow between the confronting axial surfaces, forming third and fourth seals.

12. The product of claim 11, wherein a first clearance is defined between confronting inner diametrical surfaces (120, 128) of the seal members (102, 104) and the outer diametrical surface (76) of the stem (48), and a second clearance is defined between confronting outer diametrical surfaces (122, 130) of the seal members (102, 104) and an inner diametrical surface (74) of the cavity (56);
and wherein the first clearance has a value that is less than the second clearance.

13. The product of claim 12, wherein the value of the force exerted by the biasing member (106) ranges between 5 N to 15 N, in order to cause the axial surfaces (126, 132) of the seal members (102, 104) to bear against the confronting axial surfaces (116, 47) of the bushing (100) and the valve body (46) in order to prevent fluid-flow between the axial surfaces, and in order to allow the seal members (102, 104) to move both radially and circumferentially relative to the bushing (100) and the valve body (46).

14. A method comprising:
providing an engine breathing system valve (12) comprising:
a body (46) forming a cavity (56);
a member (50) disposed within the body (46), wherein the member (50) opens and closes a port (52) formed within the body (46) to permit and prevent fluid-flow through the port (52); and
a stem (48) connected to the member (50) and extending through the cavity (56), wherein the stem (48) moves to cause the member (50) to open and close the port (52);
providing a bushing (100) that is located at the cavity (56) and around the stem (48) and that has an inboard side and an outboard side;
forming a first radial seal around an outer diametrical surface (76) of the stem (48) inboard of the bushing (100);
forming a second redial seal around an outer diametrical surface (76) of the stem (48) inboard of the bushing (100);
forming a first axial seal inboard of the bushing (100); and
forming a second axial seal inboard of the bushing (100) wherein the second axial seal is formed by a biasing member (106) located in the cavity (56), around the stem (48), and inboard of the bushing (100), wherein the biasing member (106) causes an axial surface (124,

126, 132, 134) of a seal member (102, 104) to bear against a confronting axial surface (116, 47) of the bushing (100) or the body (46) in order to prevent fluid-flow between the axial surfaces.

\* \* \* \* \*